US010968327B2

(12) United States Patent
Combs

(10) Patent No.: US 10,968,327 B2
(45) Date of Patent: Apr. 6, 2021

(54) METHODS FOR FORMULATING POLYISOCYANURATE FOAM-FORMING COMPOSITIONS, RELATED POLYISOCYANURATE FOAM-FORMING COMPOSITIONS, AND FOAMS PRODUCED THEREBY

(71) Applicant: COVESTRO LLC, Pittsburgh, PA (US)

(72) Inventor: George Combs, McMurray, PA (US)

(73) Assignee: Covestro LLC, Pittsburgh, PA (US)

( * ) Notice: Subject to any disclaimer, the term of this patent is extended or adjusted under 35 U.S.C. 154(b) by 86 days.

(21) Appl. No.: 16/113,359

(22) Filed: Aug. 27, 2018

(65) Prior Publication Data
US 2020/0062918 A1 Feb. 27, 2020

(51) Int. Cl.
C08J 9/12 (2006.01)
C08J 9/14 (2006.01)
C08L 75/06 (2006.01)

(52) U.S. Cl.
CPC .............. *C08J 9/127* (2013.01); *C08J 9/125* (2013.01); *C08J 9/141* (2013.01); *C08L 75/06* (2013.01); *C08J 2203/10* (2013.01); *C08J 2203/14* (2013.01); *C08J 2203/182* (2013.01); *C08J 2205/10* (2013.01); *C08J 2375/06* (2013.01); *C08J 2483/12* (2013.01); *C08L 2201/02* (2013.01); *C08L 2203/14* (2013.01)

(58) Field of Classification Search
CPC .......... C08J 9/0061; C08J 9/125; C08J 9/127; C08J 9/141; C08J 2203/10; C08J 2203/14; C08J 2203/182; C08J 2205/10; C08J 2375/04; C08J 2375/06; C08J 2471/02; C08J 2483/04; C08J 2483/12; C08L 75/06; C08L 2201/02; C08L 2203/14

See application file for complete search history.

(56) References Cited

U.S. PATENT DOCUMENTS

| 4,020,024 | A | 4/1977 | Walraevens et al. |
| 4,067,911 | A | 1/1978 | Walraevens et al. |
| 4,072,638 | A | 2/1978 | Boulet et al. |
| 4,572,865 | A | 2/1986 | Gluck et al. |
| 5,837,742 | A * | 11/1998 | Fishback ............ C08J 9/141 521/172 |
| 8,106,106 | B2 | 1/2012 | Letts |
| 9,447,225 | B2 | 9/2016 | Tabor et al. |
| 9,987,775 | B2 | 6/2018 | Bertucelli et al. |
| 2004/0162359 | A1 | 8/2004 | Barber et al. |
| 2004/0176494 | A1* | 9/2004 | Feske ................ C08G 18/4213 521/161 |
| 2011/0269860 | A1 | 11/2011 | Creazzo et al. |
| 2014/0066532 | A1* | 3/2014 | Combs ............... C08J 9/141 521/103 |
| 2014/0094530 | A1* | 4/2014 | Combs ............... E04D 3/18 521/107 |
| 2017/0174821 | A1 | 6/2017 | Combs et al. |
| 2017/0369668 | A1 | 12/2017 | Chen et al. |
| 2019/0071533 | A1 | 3/2019 | Wolek et al. |

FOREIGN PATENT DOCUMENTS

WO 97/21764 6/1997

OTHER PUBLICATIONS

Singh, Sachchida N. et al; "Long Term Thermal Resistance of Pentane Blown Polyisocyanurate Laminate Boards"; Journal of Cellular Plastics; vol. 39; Sage Publications; pp. 265-280; Jul. 1, 2003.
Building Science Corporation; BSC Information Sheet 502; "Understanding the Temperature Dependence of R-values for Polyisocyanurate Roof Insulation"; buildingscience.com; Apr. 12, 2013.
Saunders, J. H. and Frisch, K. C.; Polyurethanes Chemistry and Technology; Part II Technology; VIII. Rigid Foams; Interscience Publishers; Copyright 1964 by John Wiley & Sons, Inc.; pp. 251-298.
Graham, Mark S.; "Testing R-values"; Tech Today; Mar. 2015; p. 14; www.professionalroofing.net.
Graham, Mark S.; "R-value concerns"; Tech Today; May 2010; p. 24; www.professionalroofing.net.
Graham, Mark S.; "Revised R-values"; Tech Today; Dec. 2010; p. 20; www.professionalroofing.net.
Dupont; Formacel Foam Expansion Agent; Technical Information ABA-14; Temperature Effect on the Insulation Value of Polyurethane Foams; 2011 Dupont; formacel.dupont.com.
Fleurent, Hilde and Thijs, Sonja; "The Use of Pentanes as Blowing Agent in Rigid Polyurethane Foam"; Journal of Cellular Plastics; vol. 31; Nov. 1995; pp. 580-599.Pedersen, C. O.; "Advanced Zone Simulation in EnergyPlus: Incorporation of Variable Properties and Phase Change Material (PCM) Capability"; University of Illinois at Urbana-Champaign, Urbana IL, USA; Proceedings:Building Simulation 2007; pp. 1341-1345.

(Continued)

Primary Examiner — John M Cooney
(74) Attorney, Agent, or Firm — Donald R. Palladino

(57) ABSTRACT

Disclosed are methods for formulating a polyisocyanurate foam-forming composition with good low temperature insulation performance. The polyisocyanurate foam-forming composition includes: a) an organic polyisocyanate, b) a polyol composition comprising at least one polyester polyol with a nominal hydroxyl functionality of at least 2.0, c) a blowing agent composition present in an amount sufficient to produce foam having a density of less than 1.85 lb/ft3 and comprising: (1) a hydrocarbon having an atmospheric pressure boiling point of at least 68° F. (20° C.), and (2) water, d) a trimerization catalyst, e) a flame retardant, and f) a silicone surface-active agent. The methods include: (A) evaluating a measured Relative Hydrocarbon Solubility and, optionally, evaluating a measured a Surfactant Water Solubility, a Surfactant Turbidity, or evaluating both the Surfactant Water Solubility and the Surfactant Turbidity; and (B) formulating the polyisocyanurate foam-forming composition with the silicone surface-active agent in light of such evaluation.

15 Claims, No Drawings

(56) References Cited

OTHER PUBLICATIONS

Tabares-Velasco, Paulo Cesar et al; "Verification and Validation of EnergyPlus Conduction Finite Difference and Phase Change Material Models for Opaque Wall Assemblies"; NREL National Renewable Energy Laboratory; Technical Report NREL/TP-5500-55792; Jul. 2012.

Bogdan, M.; Hoerter, J.; Moore, F. O. Meeting the insulation requirements of the building envelope with polyurethane and polyisocyanurate foam. Journal of Cellular Plastics, 2005, vol. 41, pp. 41-56.

Eilbracht, C.; Schiller, C.; Metz, T.; Tachen, R. Understanding the relationship between surfactants and ages insulation value of PIR foam. Polyurethanes Technical Conference, Atlanta GA, Sep. 24-26, 2012.

* cited by examiner

METHODS FOR FORMULATING POLYISOCYANURATE FOAM-FORMING COMPOSITIONS, RELATED POLYISOCYANURATE FOAM-FORMING COMPOSITIONS, AND FOAMS PRODUCED THEREBY

FIELD

The present invention is directed to, among other things, methods for formulating a polyisocyanurate foam-forming composition with good low temperature insulation performance, related polyisocyanurate foam-forming compositions, and foams produced from such compositions.

BACKGROUND

Insulation plays an important role in the energy efficiency and environmental impact of building envelopes. In many cases, polyisocyanurate foam is used for building insulation as it has many advantages, such as relatively low installed cost, good fire resistance and high thermal resistance. As a result, it is important to understand the thermal resistance performance of such foam insulation.

In order to allow for a simple, yet consistent methodology to measure and compare thermal performance, North American manufacturers of building envelope thermal insulation test and report the R-value (a measure of thermal resistance used in the building and construction industry) of their products in compliance with industry standards. ASTM C518-17, Standard Test Method for Steady-State Thermal Transmission Properties by Means of the Heat Flow Meter Apparatus, is an industry method for measuring R-values of building insulation comprised of a cellular plastic insulation that contains gases other than air where the composition of the retained gases change with time. Two other methods referenced in that standard, ASTM C1058 (2010), Standard Practice for Selecting Temperatures for Evaluating and Reporting Thermal Properties of Thermal Insulation, Sections 4-5 and ASTM C1045 (2007), Standard Practice for Calculating Thermal Transmission Properties under Steady State Conditions, Section 6.2 address respectively the appropriate temperature ranges at which insulation thermal conductivity should be measured based on its intended use and the preferred temperature settings for the apparatus hot and cold plates that should be chosen for accurate measurements.

A problem that has been associated with polyisocyanurate foam building insulation is that, unlike some other insulation materials, it has been reported that such insulation exhibits poorer thermal resistance, i.e., reduced R-value, at low temperatures due to condensation of the gaseous blowing agents contained in the closed cells of the rigid foam. As a result, it would be desirable to provide methods for formulating a polyisocyanurate foam-forming compositions that produce a faced rigid foam laminate having a measured R-value at a temperature of 35° F. (1.7° C.), in some cases, at a temperature of 30° F. (−1.1° C.), 25° F. (−3.9° C.) or even 20° F. (−6.7° C.), that is at least as high as the R-value of the same foam laminate at 75° F. (23.9° C.), when measured according to ASTM C518-17. The present invention was made in view of the foregoing desire.

SUMMARY OF THE INVENTION

In certain respects, the present invention is directed to methods for formulating a polyisocyanurate foam-forming composition. The polyisocyanurate foam-forming composition comprises: a) an organic polyisocyanate, b) a polyol composition comprising at least one polyester polyol with a nominal hydroxyl functionality of at least 2.0, c) a blowing agent composition present in an amount sufficient to produce foam having a density of less than 1.85 lb/ft$^3$ and comprising: (1) a hydrocarbon having an atmospheric pressure boiling point of at least 68° F. (20° C.), and (2) water, d) a trimerization catalyst, e) a flame retardant, and f) a non-reactive silicone surface-active agent. The methods comprise: (A) evaluating a measured Relative Hydrocarbon Solubility (as defined in this specification) and, optionally, evaluating a measured Surfactant Water Solubility (as defined in this specification), a Surfactant Turbidity (as defined in this specification), or evaluating both the Surfactant Water Solubility and the Surfactant Turbidity; and (B) formulating the polyisocyanurate foam-forming composition with the silicone surface-active agent if either: (i) the Relative Hydrocarbon Solubility is at least 1.20; or (ii) the Surfactant Water Solubility is less than 2%, the Surfactant Turbidity is greater than 100, and the Relative Hydrocarbon Solubility is at least 1.05 and less than 1.20.

In another respect, the present specification is directed to methods for producing a faced rigid foam laminate having a foam density of less than 1.85 lb/ft$^3$ and an R-value measured at a temperature of 35° F. (1.7° C.) that is at least as high as the R-value of the same foam laminate measured at 75° F. (23.9° C.), each when measured according to ASTM C518-17. The methods comprise reacting an organic polyisocyanate and a polyester polyol with a nominal hydroxyl functionality of at least 2.0 in the presence of foam-forming composition components comprising: (i) a blowing agent composition present in an amount sufficient to produce foam having a density of less than 1.85 lb/ft$^3$ and comprising: (1) a hydrocarbon having an atmospheric pressure boiling point of at least 68° F. (20° C.), and (2) water, (ii) a trimerization catalyst, (iii) a flame retardant, and (iv) a non-reactive silicone surface-active agent that has a Relative Hydrocarbon Solubility (as defined in this specification) of at least 1.20, a Surfactant Water Solubility (as defined in this specification) of 1.0% to 2.0%, and a Surfactant Turbidity (as defined in this specification) of at least 150.

The present invention is also directed to, among other things, foam laminates produced from such methods.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Unless otherwise indicated by the context, as used herein, the term "mean insulation temperature", when used with reference to measurement of an R-value or thermal conductivity (k-factor) of an insulation material, means the mathematical mean of the two parallel plate temperatures in contact with either surface of the insulation material being tested.

As indicated, certain embodiments of the present invention are directed to methods for formulating a polyisocyanurate foam-forming composition. The methods enable the identification of polyisocyanurate foam-forming compositions that, in at least some cases, can produce a faced rigid foam laminate having a measured R-value at a temperature of 35° F. (1.7° C.), in some cases, at a temperature of 30° F. (−1.1° C.), 25° F. (−3.9° C.) or even 20° F. (−6.7° C.), that is at least as high as the R-value of the same foam laminate at 75° F. (23.9° C.), each when measured according to ASTM C518-17. For simplification, the term "crossover temperature" may be used in this specification, where used it refers to the temperature where the R-value of a faced rigid foam laminate is equal to its R-value at 75° F. (23.9° C.). Also, the term "relative R-value Index (RRI)" at a given temperature may be used in this specification, where used it represents the R-value of a faced rigid foam laminate at that temperature minus its R-value at 75° F. (23.9° C.) divided by its R-value at 75° F. (23.9° C.) expressed in percent.

The polyisocyanurate foam-forming compositions formulated according to certain methods of the present invention comprise: a) an organic polyisocyanate, b) a polyol composition comprising at least one polyester polyol with a nominal hydroxyl functionality of at least 2.0, c) a blowing agent composition, d) a trimerization catalyst, e) a flame retardant, and f) a non-reactive silicone surface-active agent.

Any of the known organic polyisocyanates can be used in the practice of the methods of the present specification. Examples of suitable polyisocyanates include, without limitation, substituted or unsubstituted aromatic, aliphatic, and cycloaliphatic polyisocyanates having at least two isocyanate groups. Polyfunctional aromatic isocyanates are often used. Specific examples of suitable aromatic isocyanates include, but are not limited to, 4,4'-diphenylmethane diisocyanate (MDI), polymeric MDI (pMDI), toluene diisocyanate, allophanate-modified isocyanates, isocyanate-terminated prepolymers and carbodiimide-modified isocyanates. In some embodiments, the organic polyisocyanate comprises pMDI having an average NCO functionality of from 2.2 to 3.3 and a viscosity of from 25 to 2000 mPas and prepolymers thereof prepared with polyols or other oligomers or polymers such as polyether or polyester polyols that contain active hydrogen atoms. In certain embodiments, the pMDI has a functionality of from 2.2 to 3.0 and a viscosity less than about 800 mPas at 25° C. Any mixtures of organic polyisocyanates may, of course, be used.

In certain embodiments, the organic polyisocyanate(s) is/are included in the foam-forming system, i.e., composition, in an amount of at least 50%, such as from 55% to 75%, or, in some cases, from 59% to 69% by weight, based on total weight of the foam-forming composition.

The polyol composition comprises at least one polyester polyol with a nominal hydroxyl functionality of at least 2.0. In certain embodiments, the isocyanate-reactive material comprises an aromatic polyester polyol, optionally in combination with a polyether polyol. The polyols have, for example, an average hydroxyl functionality of from 2 to 8, such as 2 to 6, or, in some cases, 2.0 to 2.5, and/or a hydroxyl number of 100 mg KOH/gm polyol to 1000 mgKOH/gm polyol or, in some cases, 200 mgKOH/gm polyol to 500 mgKOH/gm polyol. In certain embodiments, a blend of an aromatic polyester polyol and a polyester and/or polyether polyol that contains renewable content derived from incorporation of regenerable materials, such as fatty acid triglycerides, sugar, or natural glycerin, is used.

In certain embodiments, the polyol(s) is/are a present in an amount of 10% to 40%, such as 20% to 40%, or, in some cases, 25% to 35% by weight, based on total weight of the foam-forming composition.

In the present invention, the relative amounts of organic polyisocyanate and polyol(s) used in the polyisocyanurate foam-forming composition are selected so as to provide the composition with a NCO:OH index of at least 1.8, such as at least 2.0, or, in some cases, 2.0 to 3.0.

As indicated, the polyisocyanurate foam-forming composition formulated in certain methods of the present specification comprises a blowing agent composition comprising one or more hydrocarbon blowing agents with an atmospheric pressure boiling point of at least 20° C. (68° F.) and water. As used herein, "hydrocarbon" refers to chemical compounds composed primarily of carbon and hydrogen that may contain heteroatoms such as oxygen, nitrogen, sulfur, or other elements. In certain embodiments, halogenated blowing agents with a global warming potential ("GWP")≥25 (100 year) and ozone depletion potential ("ODP")>0 are not used in the practice of the methods of the present specification.

Specific examples of suitable hydrocarbons with an atmospheric pressure boiling point of at least 20° C. (68° F.) include, but are not limited to, n-pentane (atmospheric pressure boiling point of 36.1° C. (96.9° F.)), isopentane (atmospheric pressure boiling point of 27.7° C. (81.9° F.)), cyclopentane (atmospheric pressure boiling point of 49° C. (120.2° F.)), hexane (atmospheric pressure boiling point of 68° C. (154.4° F.)), 2,2-dimethylbutane (atmospheric pressure boiling point of 50° C. (122° F.)), 2-methylpentane (atmospheric pressure boiling point of 60° C. (140° F.)), 1-hexene (atmospheric pressure boiling point of 63° C. (145.4° F.)), 1-pentene (atmospheric pressure boiling point of 30° C. (86° F.)), acetone (atmospheric pressure boiling point of 56° C. (132.8° F.)), acetaldehyde (atmospheric pressure boiling point of 20.2° C. (68.4° F.)), dimethyl carbonate (atmospheric pressure boiling point of 90° C. (194° F.)), methylal (atmospheric pressure boiling point of 42.3° C. (108.1° F.)), ethyl formate (atmospheric pressure boiling point of 54.3° C. (129.7° F.)), methyl acetate (atmospheric pressure boiling point of 56.9° C. (134.4° F.)), and methyl formate (atmospheric pressure boiling point of 31.8° C. (89.2° F.)). As will of course be appreciated, mixtures of two or more of any of the foregoing or unlisted suitable hydrocarbons can be used. In certain embodiments, the hydrocarbons with an atmospheric pressure boiling point of at least 20° C. (68° F.) is n-pentane, isopentane, and/or cyclopentane.

In certain embodiments, the hydrocarbon with an atmospheric pressure boiling point of at least 20° C. (68° F.) is present in an amount such that an "effective hydrocarbon blowing agent vapor pressure" is equivalent to its saturation vapor pressure at 60° F. (15.6° C.) or lower temperature. As described in this specification, the "effective hydrocarbon blowing agent vapor pressure" takes into account the weight fraction of the blowing agent that may be dissolved in the polymer matrix. In some cases, the maximum level of the hydrocarbon blowing agent ranges from 1.02 to 1.14 times the corresponding amount that can be used in the foam to match the hydrocarbon blowing agent saturation vapor pressure at 60° F. (15.6° C.) or lower temperature depending upon the polarity of the surfactant, the surfactant's relative blowing agent solubility ratio in the polyol component, and the level of surfactant in the polyisocyanurate foam-forming composition. In some cases, the hydrocarbon with an atmospheric pressure boiling point of at least 20° C. (68° F.) is present in an amount of at least 1% by weight, such as at least 3% by weight, or, in some cases, at least 4% by weight and up to 10% by weight, such as up to 9% by weight, or, in some cases, up to 8% by weight, based on total weight of the foam-forming composition. The amount of hydrocarbon with an atmospheric pressure boiling point of at least 20° C. (68° F.) included in the foam-forming composition will often range from 3% to 10% by weight, such as 4 to 10% by weight, based on total weight of the foam-forming composition.

In addition to the hydrocarbon blowing agent, some water is included in the blowing agent composition. As will be appreciated, water reacts with isocyanates to produce carbon dioxide gas as an auxiliary blowing agent. The amount of water included in the foam-forming composition will often range from 0.05% to 1.0% by weight, such as 0.1% to 0.8% by weight, based on total weight of the foam-forming composition. The amount of water included in the foam-forming composition will often range from 0.25% to 0.7% by weight, such as 0.35% to 0.6% by weight, based on total weight of the foam-forming composition.

If desired, it is also possible that the blowing agent composition comprises a hydrocarbon, such as a hydrofluoroolefin, having an atmospheric pressure boiling point of less than 20° C. (68° F.), specific examples of which include, but are not limited to, butane (atmospheric pressure boiling point of -1° C. (30.2° F.)), isobutane (atmospheric pressure boiling point of -11.7° C. (10.9° F.)), butylene (atmospheric pressure boiling point of -6.6° C. (20.1° F.)), isobutylene (atmospheric pressure boiling point of -6.9° C. (19.6° F.)), trans-1-chloro-3,3,3-trifluoropropene (atmospheric pressure boiling point of 19° C. (66.2° F.)), and dimethyl ether (atmospheric pressure boiling point of -24° C. (-11.2° F.)).

In certain embodiments, the blowing agent composition is present in an amount sufficient to produce foam having a density of less than 1.85 lb/ft$^3$, in some cases no more than 1.80 lb/ft$^3$ (28.8 kg/m$^3$), such as 1.28 to 1.80 lb/ft$^3$ (20.5 to 28.8 kg/m$^3$). In certain embodiments, to identify an appropriate blowing agent composition that will produce a foam having such a density, a multi-step process is used in which, in a first step, a calculated mass of blowing agent needed to make a foam having the preselected target foam density is determined where condensation of the blowing agent does not occur above a targeted inflection point temperature, which is, in some cases 60° F. (15.6° C.) or lower. To do this, a derivative of the Clausius Clapyeron equation called the Antoine equation that uses an empirical three parameter fit to predict the saturated vapor pressure of a pure liquid at a given temperature is used. According to the Antoine equation:

$$\log P = A - B/(T+C)$$

wherein: (a) T is temperature in ° C.; (b) P is pressure in mmHg; (c) and A, B, and C are Antoine coefficients having values determined experimentally. Values for A, B, and C can be found at http://www.eng.auburn.edu/~drmills/mans486/Diffusion %20Tube/Antoine_coefficient_table.PDF. The Antoine coefficients for some exemplary hydrocarbon blowing agents are set forth in the Table below:

| | Compound | | |
|---|---|---|---|
| | A | B | C |
| n-pentane | 6.87632 | 1075.780 | 233.205 |
| Isopentane | 6.83315 | 1040.730 | 235.445 |
| Cyclopentane | 6.88676 | 1124.162 | 231.361 |
| Hexane | 6.87024 | 1168.720 | 224.210 |
| 2,2-dimethylbutane | 6.75483 | 1081.176 | 229.343 |
| 2-methylpentane | 6.83910 | 1135.410 | 226.572 |
| 1-hexene | 6.86572 | 1152.971 | 225.849 |
| 1-pentene | 6.84650 | 1044.895 | 233.516 |
| Acetone | 7.23160 | 1277.030 | 237.230 |

-continued

|  | Compound | | |
|---|---|---|---|
|  | A | B | C |
| Methyl Formate | 7.17040 | 1125.200 | 230.650 |
| Acetaldehyde | 7.05650 | 1070.600 | 236.010 |

As is apparent, the Antoine equation identifies the saturation vapor pressure of a pure liquid at a selected temperature. According to certain methods of the present specification, the selected temperature is 60° F. (15.6° C.) or lower.

In certain embodiments, by preselecting a target foam density, such as a density within the range of 1.28 to 1.8 lb/ft³ (20.5 to 28.8 kg/m³), the volume occupied by the solid polyurethane component of a selected amount of foam is subtracted (the density of a solid polyurethane component of a foam is assumed for purposes of the present invention to be 1245 g/L), to obtain the estimated volume of space that contains the blowing agent at the saturation vapor pressure of the blowing agent.

Next, in certain embodiments, the ideal gas law is used to calculate the maximum mass of a selected blowing agent that can be used to produce a foam having the preselected target foam density. According to the Ideal Gas law:

$$n = PV/RT,$$

wherein (i) n is moles of gas, (ii) P is the pressure of the gas in atmospheres, (iii) V is the volume of the gas in liters, R is the ideal gas constant (0.08206 L·atm/(mol·K)); and T is the temperature of the gas in Kelvin. Use of the Ideal Gas Law in which P is the predicted saturated vapor pressure as determined by the Antoine equation as described above and T is a selected calculated condensation temperature as described above, allows calculation of the maximum amount of particular blowing agent that can be used to avoid condensation of the blowing agent above the temperature T. In accordance with embodiments of the methods of the present specification, this process is repeated for any hydrocarbon blowing agent of interest for use in the formulation and a hydrocarbon blowing agent composition is selected in which the total mass of hydrocarbon blowing agent is selected according to the calculated mass of hydrocarbon blowing agent needed to make a foam having the preselected target foam density and the mass of each individual hydrocarbon blowing agent in the blowing agent composition is at or below the maximum amount of such blowing agent that can be used to avoid condensation of the blowing agent above the temperature T.

The calculated maximum amount of blowing agent allowed for a given foam density at the targeted dew point does not take into account any dissolution or adsorption of the blowing agent by the polymer matrix of the foam. It is currently believed that as the solubility of the blowing agent in the foam matrix increases, larger amounts of the blowing agent can be used in the foam formulation since the "effective vapor phase concentration" of the blowing agent doesn't exceed the maximum value obtained using the aforementioned Antoine equation.

Table 1 below shows the calculated dew points equal to or less than 60° F. (15.6° C.) for foams at different target densities with isopentane, n-pentane, isopentane/n-pentane blends, or cyclopentane as the hydrocarbon blowing agent where the blowing agent concentration in the cell gas phase is fixed at 5.46% of the total formulation for those foam-forming compositions containing n-pentane or isopentane and 3.20% for cyclopentane. The examples illustrate that as little as 5.47% or as much as 6.22% total blowing agent may be used for the aliphatic pentanes assuming that 2% to about 12% of the total blowing agent used is dissolved in the polymer matrix depending upon the polyol component, surfactant, and surfactant level. Since cyclopentane is generally more soluble in polyester polyols than the aliphatic isomers, as much as 1.33 times the "effective vapor phase concentration" can be used in the inventive polyisocyanurate foam formulations disclosed in this application despite its relatively high boiling point/low vapor pressure.

TABLE 1

| Blowing Agent | Target Foam Density | Target Dew Point Temperature ° F. (° C.) | Calculated % blow agent in foam gas phase | Calculated Total % blowing agent in foam* | BA Vapor Pressure (atm.) | BA Calculated Cell Gas Pressure (atm.) |
|---|---|---|---|---|---|---|
| Isopentane | 1.32 | 35 (1.67) | 5.46 | 5.47 to 6.22 | 0.3670 | 0.3670 |
|  | 1.45 | 40 (4.44) | 5.46 | 5.47 to 6.22 | 0.4075 | 0.4075 |
|  | 1.62 | 45 (7.22) | 5.46 | 5.47 to 6.22 | 0.4613 | 0.4613 |
| n-Pentane | 1.32 | 51 (10.55) | 5.46 | 5.47 to 6.22 | 0.3785 | 0.3785 |
|  | 1.45 | 55 (12.78) | 5.46 | 5.47 to 6.22 | 0.4202 | 0.4202 |
|  | 1.62 | 61 (16.11) | 5.46 | 5.47 to 6.22 | 0.4755 | 0.4755 |
| 60/40 Isopentane/n-Pentane Blend | 1.32 | 41 (5.00) | 5.46 | 5.47 to 6.22 | 0.3712 | 0.3712 |
|  | 1.45 | 45 (7.22) | 5.46 | 5.47 to 6.22 | 0.4122 | 0.4122 |
|  | 1.62 | 51 (10.55) | 5.46 | 5.47 to 6.22 | 0.4665 | 0.4665 |
| Cyclopentane | 1.32 | 52 (11.11) | 3.20 | 3.26 to >4.26 | 0.2342 | 0.2342 |
|  | 1.45 | 55 (12.78) | 3.20 | 3.26 to >4.26 | 0.2535 | 0.2535 |
|  | 1.62 | 60 (15.56) | 3.20 | 3.26 to >4.26 | 0.2867 | 0.2867 |

*Assumes total BA level range of 1.02 to 1.14 times "effective hydrocarbon blowing agent" concentration except for cyclopentane where the factor is 1.02 to 1.33

The polyisocyanurate foam-forming composition also includes a flame retardant composition. Suitable flame retardants for use in the foam-forming composition include, without limitation, halogenated, such as brominated flame retardants, such as brominated polyols, and phosphonated flame retardants, such as a halogenated, such as chlorinated, phosphates.

In certain embodiments, the brominated flame retardant comprises a brominated polyether polyol of the general formula (I):

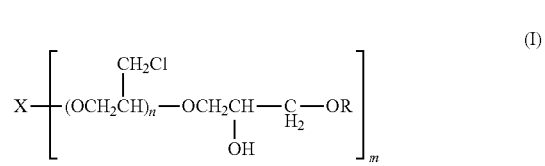

in which n is a number of 0 to 7, m is a number of 2 to 3; X is a saturated or unsaturated brominated polyol residue; and R is hydrogen or an alkyl group having 1 to 5 carbon atoms. Specific examples of suitable brominated polyether polyols are commercially available as Ixol® B-251 and Ixol® M-125 from Solvay Fluorides LLC, which are believed to be produced using the procedure described U.S. Pat. Nos. 4,020,024, 4,067,911 and 4,072,638. Other suitable brominated flame retardants include, but are not limited to, 3,4,5,6-tetrabromophthalic acid, tribromoneopentyl alcohol, 1,3-propanediol, 2,2-bis(bromomethyl), and pentabromophenyl ether, among others, including mixtures of two or more thereof. Suitable commercially available brominated flame retardants also include those available from ICL Industrial Products as the SaFRon® (6000 Series) brominated flame retardants. Mixtures of two or more of such brominated flame retardants can be used. In certain embodiments, the brominated flame retardant does not contain phosphorous.

Specific examples of suitable phosphorous compounds, such as halogenated phosphates, include, without limitation, tris-(2-chloroethyl)phosphate, tris-(2-chloroisopropyl)phosphate (TCPP), tris(1,3-dichloroisopropyl)phosphate, tris-(2,3-dibromopropyl)phosphate and tetrakis-(2-chloroethyl)ethylene diphosphate, Diethyl Bis-(2-hydroxyethyl)-aminomethylphosphonate, phosphoric acid, triethyl ester, polymer with oxirane and phosphorus oxide ($P_2O_5$), triethyl phosphate, including mixtures of two or more thereof. Isocyanate-reactive and/or non-reactive non-halogenated phosphorous compounds are often used, such as diethylhydroxymethylphosphonate.

In certain embodiments, the total amount of flame retardant in the first polyisocyanurate foam-forming composition is at least 1% by weight, such as at least 2% by weight and no more than 10% by weight, such as no more than 5% by weight, based on the total weight of the foam-forming composition.

The polyisocyanurate foam-forming composition comprises a surface-active agent, i.e., surfactant, to; for example, stabilize the foaming reaction mixture until it obtains rigidity. According to methods of the present specification, the surfactant utilized is a non-reactive silicone surface-active agent. As used herein, "non-reactive" means that the molecular structure of the surfactant does not contribute a significant amount of isocyanate-reactive functional groups to the foam formulation, such as reactive—OH, —SH, or —NH groups. In some embodiments, the non-reactive surfactant has a hydroxyl number of not less than 20 mg KOH/g of surfactant, in some cases no less than 10 mg KOH/g of surfactant and no more than 300 mg KOH/g of surfactant. As used herein, "silicone" is synonymous with polysiloxane polymers, which are based on a structure comprising alternate silicon and oxygen atoms. In some embodiments, the silicone is a silicone polyether, which contains, in addition to alternating silicon and oxygen atoms, also polyether linkages, often pendant to the molecular backbone where a majority of the terminal functional groups of the pendant polyethers are reactive. Often, 0.1 to 10% by weight, such as 0.5 to 1% by weight, of the non-reactive silicone surface-active agent is used, based on the total weight of the foam-forming composition.

Evaluation of surfactants is a feature of certain methods of the present specification, as will be discussed in detail below.

In certain embodiments, one or more catalysts are used in the foam-forming composition. Suitable catalysts include tertiary amines, such as, without limitation, triethylenediamine, N-methylmorpholine, pentamethyl diethylenetriamine, dimethylcyclohexylamine, tetra-methylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine, bis(2-dimethylaminoethyl) ether, and dimethyl-benzyl amine. A catalyst for the trimerization of polyisocyanates, such as an alkali metal alkoxide or carboxylate, or certain tertiary amines, is employed in the methods of the present specification. Catalysts are used in an amount which measurably increases the rate of reaction of the polyisocyanate. Typical amounts are 0.1 to 10.0% by weight, based on the total weight of the foam-forming composition.

The polyisocyanurate foam-forming compositions described herein can be used in the production of faced rigid foam laminates by reacting the organic polyisocyanate and the isocyanate-reactive composition in the presence of the blowing agent composition. Any of the known techniques for producing a rigid polyisocyanurate faced foam laminate may be used. As used herein, the term "polyisocyanurate faced rigid foam laminate" refers to a structure comprising a polyisocyanurate foam core having two major surfaces and a facing material adhered to at least one of the major surfaces of the foam. As indicated, in the present invention, the foam in such polyisocyanurate faced foam laminate is a rigid foam, which for purposes of the present invention refers to a foam that meets the compressive strength and flexural strength values listed in Table 1 of ASTM C1289-15.

Processes for producing polyisocyanurate faced foam laminates from foam-forming compositions are known to those skilled in the art. Examples of suitable processes include: methods for producing polyisocyanurate laminated boardstock insulation, froth-forming method for continuously producing glass fiber reinforced insulation boards in accordance with teachings of U.S. Pat. No. 4,572,865, continuous or discontinuous methods for producing insulated metal panels, and methods for producing molded or free-rise rigid foam articles. Another suitable method is disclosed in U.S. Pat. No. 8,106,106, which is also incorporated herein by reference.

In the polyisocyanurate faced foam laminate, the facing material adhered to at least one of the major surfaces of the foam often comprises a layer or layers of organic and/or inorganic fibers or flexible foils, such as aluminum foils. Suitable natural organic fibers include, but are not limited to, cotton and cotton waste fibers; regenerated cellulose staple fibers and cellulose acetate fibers. Suitable synthetic organic fibers include, but are not limited to, polyester fibers, polyamide fibers, polyvinyl acetal fibers, and polypropylene fibers. Suitable inorganic fibers include, but are not limited to, glass fibers, glass wool fibers, mineral wool fibers, rock wool fibers and slag wool fibers. Combinations of the above fibers also can be used. The fibrous layer(s) is often such that a polymeric foam which is frothed in place on the layer(s) can be readily introduced among the fibers thereof without penetrating or wetting entirely through the layer(s). In certain embodiments, a fiber glass facer mat comprising chopped glass fibers oriented in a random pattern and bonded together with a suitable binder is used.

In certain embodiments, the polyisocyanurate faced foam laminate is produced by a method comprising: (a) conveying a lower fibrous facing layer along a production line: (b) mixing an organic polyisocyanate and a isocyanate-reactive composition in the presence of the blowing agent composition to form a foaming mixture; (c) depositing the foaming mixture onto the lower fibrous facing layer as it is conveyed along the production line; and (d) allowing the foaming mixture to expand and contact an advancing upper fibrous facing layer as it is conveyed along the production line. Such methods are described, for example, in U.S. Pat. No. 4,572,865 at col. 4, line 58 to col. 9, line 47, the cited portion of which being incorporated herein by reference.

In certain embodiments, the resulting faced foam laminate has a core foam density of less than 1.85 lb/ft$^3$ (29.6 kg/m3), such as less than 1.80 lb/ft$^3$ (28.8 kg/m$^3$), such as 1.28 to less than 1.80 lb/ft$^3$ (20.5 to 28.8 kg/m$^3$). Moreover, in certain embodiments, the thickness of the fully expanded foam core is from 0.25 to 6 inches (6.35 to 152.4 millimeters), such as 1 to 4 inches (25.4 to 101.6 millimeters), or, in some cases, 1.5 to 3 inches (38.1 to 76.2 millimeters).

As previously indicated, certain methods of the present specification comprise evaluating a measured Relative Hydrocarbon Solubility and, optionally, evaluating a measured a Surfactant Water Solubility, a Surfactant Turbidity, or evaluating both the Surfactant Water Solubility and the Surfactant Turbidity; and subsequently formulating the polyisocyanurate foam-forming composition in light of the results of that evaluation. Such an evaluation can be implemented in any of a variety of ways, including, but not limited to, software implementation, if desired.

As used herein, "Relative Hydrocarbon Solubility" refers to the relative change in solubility of hydrocarbon blowing agent(s) being considered for use in the polyisocyanurate foam-forming composition in the polyol(s) being considered for use in the polyisocyanurate foam-forming composition, upon inclusion of a non-reactive silicone surface-active agent being considered or upon increase in the amount of a non-reactive silicone surface-active agent being considered. For purposes of the methods of the present specification, Relative Hydrocarbon Solubility is determined by adding the blowing agent(s) to such polyol(s), optionally also in the presence of some non-reactive silicone surface-active agent, on the one hand, and separately adding the blowing agent(s) to a blend of the polyol(s) and a non-reactive silicon surface-active agent on the other hand, in each case in the level of blowing agent required to achieve the desired foam density, to form an emulsion. After allowing the emulsion to separate, the amount of blowing agent dissolved in the saturated polyol phase is measured, such as by using direct insertion GC analysis. The Relative Hydrocarbon Stability is the amount of the blowing agent(s) dissolved in the polyol(s)/non-reactive silicone surface-active agent blend divided by the amount of blowing agent(s) dissolved in the polyol(s) that is either free of non-reactive silicone surface-active agent or containing less non-reactive silicone surface-active agent than the other blend.

As used herein, "Surfactant Water Solubility" refers to the minimum amount of non-reactive silicone surface-active agent added to water (such as deionized water) at room temperature (70° F. to 75° F.) that causes the onset of persistent visually observable (to the naked human eye) turbidity or cloudiness after thorough mixing of the combination. If a concentration of at least 5% by weight of the non-reactive silicone surface-active agent surfactant in water does not cause such turbidity or cloudiness, then it is considered to be "water soluble" for the purpose of this specification. As used herein "Surfactant Turbidity" refers to the turbidity of the water/non-reactive silicone surface-active agent mixture containing persistent visually observable (to the naked human eye) turbidity or cloudiness after thorough mixing of the combination, measured with a turbidimeter, as described in the Examples.

As indicated, some methods of the present specification comprise formulating the polyisocyanurate foam-forming composition with the non-reactive silicone surface-active agent if either: (i) the Relative Hydrocarbon Solubility is at least 1.20; or (ii) the Surfactant Water Solubility is less than 2%, the Surfactant Turbidity is greater than 150, and the Relative Hydrocarbon Solubility is at least 1.05 and less than 1.20.

It has been surprisingly discovered that, in at least some cases, good low temperature thermal insulation performance of the low density foams produced from the foam-forming compositions described in this specification can be achieved by utilizing non-reactive silicone surface-active agent, in the amounts described above, if the non-reactive silicone surface-active agent exhibits (i) Relative Hydrocarbon Solubility at least 1.20, in some cases at least 1.25, (ii) a Surfactant Water Solubility of 1.0% to 2.0%, such as 1.0% to 1.5%, and (iii) a Surfactant Turbidity of at least 150, such as 150 to 400. More specifically, it has been surprisingly discovered that, in at least some cases, low density foams produced from the foam-forming compositions described in this specification can exhibit a Crossover Temperature of no more than 35° F., in some cases, less than 25° F. when utilizing non-reactive silicone surface-active agent, in the amounts described above, if the non-reactive silicone surface-active agent exhibits this combination of Relative Hydrocarbon Solubility, Surfactant Water Solubility, and Surfactant Turbidity. An example of a non-reactive silicone surfactant that has a Relative Hydrocarbon Solubility less than 1.20, a Surfactant Water Solubility of 1.0% to 2.0%, and a Surfactant Turbidity of at least 150 is Dabco® SI3201, commercially available from Evonik Industries. An example of a non-reactive silicone surface active agent that is commercially available and that exhibits a Relative Hydrocarbon Solubility of at least 1.20, but a Surfactant Water Solubility >2.0%, and a Surfactant Turbidity of less than 100 is Tegostab® B4504, commercially available from Evonik Industries.

As a result, embodiments of this specification are directed to methods for producing a faced rigid foam laminate having a foam density of less than 1.85 lb/ft$^3$ and an R-value measured at a temperature of 35° F. (1.7° C.), 25° F. (−3.9° C.) or, in some cases, 20° F. (−6.7° C.), that is at least as high as the R-value of the same foam laminate measured at 75° F. (23.9° C.), each when measured according to ASTM C518-17. The methods comprise reacting an organic polyisocyanate and a polyester polyol with a nominal hydroxyl functionality of at least 2.0 in the presence of foam-forming composition components comprising: (i) a blowing agent composition present in an amount sufficient to produce foam having a density of less than 1.85 lb/ft$^3$ and comprising: (1) a hydrocarbon having an atmospheric pressure boiling point of at least 68° F. (20° C.), and (2) water, (ii) a trimerization catalyst, (iii) a flame retardant, and (iv) a non-reactive silicone surface-active agent that has a Relative Hydrocarbon Solubility of at least 1.20, such as at least 1.25, a Surfactant Water Solubility of 1.0% to 2.0%, such as 1.0% to 1.5%, and a Surfactant Turbidity of at least 150, such as 150 to 400.

Alternatively, in some embodiments, the non-reactive silicone surface-active agent employed exhibits either Relative Hydrocarbon Solubility of at least 1.20 (but a Surfactant Water Solubility of greater than 2.0% and a Surfactant Turbidity of less than 100), or exhibits Surfactant Water Solubility of less than 2%, Surfactant Turbidity greater than 100, and Relative Hydrocarbon Solubility of at least 1.05 and less than 1.20. It has also been surprisingly discovered that, in at least some cases, good low temperature thermal insulation performance of the low density foams produced from the foam-forming compositions described in this specification can be achieved by utilizing a non-reactive silicone surface-active agent, in the amounts described above, exhibiting such particular combination of attributes. More specifically, it has been surprisingly discovered that, in at least some cases, low density foams produced from the foam-forming compositions described in this specification can exhibit a Crossover Temperature of 30° F. (−1.1° C.) to 35° F. (1.7° C.) when utilizing non-reactive silicone surface-active agent, in the amounts described above, if the non-reactive silicone surface-active agent exhibits either Relative Hydrocarbon Solubility of at least 1.20, or the combination of Surfactant Water Solubility of less than 2%, Surfactant Turbidity greater than 100, and Relative Hydrocarbon Solubility of at least 1.05 and less than 1.20. Examples of non-reactive silicone surface active agents that are commercially available and that exhibit Surfactant Water Solubility of less than 2%, Surfactant Turbidity greater than 100, and Relative Hydrocarbon Solubility of at least 1.05 and less than 1.20 include Tegostab® B8513 and Dabco® SI3201, commercially available from Evonik Industries. An example of a non-reactive silicone surface active agent that is commercially available and that exhibits Relative Hydrocarbon Solubility of at least 1.20 (but a Surfactant Water Solubility of greater than 2.0% and a Surfactant Turbidity of less than 100) is Tegostab® B84504, commercially available from Evonik Industries.

In some embodiments, the hydrocarbon blowing agent(s) employed are those that exhibit solubility in the polyol(s) of the polyisocyanurate foam-forming composition that is less than 15% by weight but greater than 5% in the absence of any other additives or surface-active agents. In certain embodiments, the selection of proper non-reactive silicone surface-agent agent(s), as described above, increases the solubility of the hydrocarbon blowing agent(s) in the polyol(s) of the polyisocyanurate foam-forming composition by at least 5%, in some cases at least 14%, relative to its baseline solubility. Surprisingly, higher boiling hydrocarbon blowing agents that exhibit baseline solubility in the polyol(s) of the polyisocyanurate foam-forming composition greater than 15% or even greater than 20% can be used to produce low density foams from the comparative foam-forming compositions described in this specification that exhibit a crossover temperature of 25° F. (−3.9° C.) to 35° F. (1.7° C.) when utilizing non-reactive silicone surface-active agent that don't meet the criteria necessary for the inventive polyisocyanurate foam-forming compositions disclosed in this application. Nevertheless low density foams produced from the inventive polyisocyanurate foam-forming compositions described in this specification using hydrocarbon blowing agents with baseline solubility greater than 20% exhibit crossover temperatures of no more than 30° F. (−1.1° C.), in some cases, much less than 20° F. (−6.7° C.) when utilizing non-reactive silicone surface-active agent, in the amounts described above, if the non-reactive silicone surface-active agent exhibits the preferred combination of Relative Hydrocarbon Solubility, Surfactant Water Solubility, and Surfactant Turbidity.

Various aspects of the subject matter described herein are set out in the following numbered clauses:

Clause 1. A method for formulating a polyisocyanurate foam-forming composition, comprising: a) an organic polyisocyanate, b) a polyol composition comprising at least one polyester polyol with a nominal hydroxyl functionality of at least 2.0, c) a blowing agent composition present in an amount sufficient to produce foam having a density of less than 1.85 lb/ft$^3$ and comprising: (1) a hydrocarbon having an atmospheric pressure boiling point of at least 68° F. (20° C.), and (2) water, d) a trimerization catalyst, e) a flame retardant, and f) a non-reactive silicone surface-active agent, the method comprising: (A) evaluating a measured Relative Hydrocarbon Solubility and, optionally, evaluating a measured a Surfactant Water Solubility, a Surfactant Turbidity, or evaluating both the Surfactant Water Solubility and the Surfactant Turbidity; and (B) formulating the polyisocyanurate foam-forming composition with the silicone surface-active agent if either: (i) the Relative Hydrocarbon Solubility is at least 1.20; or (ii) the Surfactant Water Solubility is less than 2%, the Surfactant Turbidity is greater than 100, and the Relative Hydrocarbon Solubility is at least 1.05 and less than 1.20.

Clause 2. The method of Clause 1, wherein the hydrocarbon having an atmospheric pressure boiling point of at least 20° C. (68° F.) comprises n-pentane, isopentane, cyclopentane, or a mixture of any two or more thereof.

Clause 3. The method of Clause 1 or Clause 2, wherein the hydrocarbon having an atmospheric pressure boiling point of at least 20° C. (68° F.) is present in the foam-forming composition in an amount of 3% to 10% by weight, based on total weight of the foam-forming composition.

Clause 4. The method of one or more of Clause 1 to Clause 3, wherein water is included in the foam-forming composition in an amount of 0.05% to 1.0% by weight, based on total weight of the foam-forming composition.

Clause 5. The method of one or more of Clause 1 to Clause 4, wherein the blowing agent composition is present in an amount sufficient to produce foam having a density of 1.28 to 1.80 lb/ft$^3$ (20.5 to 28.8 kg/m$^3$).

Clause 6. The method of one or more of Clause 1 to Clause 5, wherein the non-reactive silicone surface-active agent comprises a silicone polyether.

Clause 7. The method of one or more of Clause 1 to Clause 6, wherein the non-reactive silicone surface-active agent exhibits (i) a Relative Hydrocarbon Solubility of at least 1.20, (ii) a Surfactant Water Solubility of 1.0% to 2.0%, and (iii) a Surfactant Turbidity of at least 150.

Clause 8. A method for producing a faced rigid foam laminate having a foam density of less than 1.85 lb/ft$^3$ and an R-value measured at a temperature of 35° F. (1.7° C.) that is at least as high as the R-value of the same foam laminate measured at 75° F. (23.9° C.), each when measured according to ASTM C518-17, the method comprising: reacting an organic polyisocyanate and a polyester polyol with a nominal hydroxyl functionality of at least 2.0 in the presence of foam-forming composition components comprising: (i) a blowing agent composition present in an amount sufficient to produce foam having a density of less than 1.85 lb/ft$^3$ and comprising: (1) n-pentane, isopentane, cyclopentane, or a mixture of any two or more thereof, and (2) water, (ii) a trimerization catalyst, (iii) a flame retardant, and (iv) a non-reactive silicone surface-active agent that has a Relative Hydrocarbon Solubility of at least 1.20, a Surfactant Water Solubility of 1.0% to 2.0%, and a Surfactant Turbidity of at least 150.

Clause 9. The method of Clause 8, wherein the reactive silicone surface-active agent has a Relative Hydrocarbon Solubility of at least 1.25, a Surfactant Water Solubility of 1.0% to 1.5%, and a Surfactant Turbidity of 150 to 400.

Clause 10. The method of Clause 8 or Clause 9, wherein the n-pentane, isopentane, cyclopentane, or mixture of any two or more thereof is present in the foam-forming composition in an amount of 3% to 10% by weight, based on total weight of the foam-forming composition.

Clause 11. The method of one or more of Clause 8 to Clause 10, wherein water is included in the foam-forming composition in an amount of 0.05% to 1.0% by weight, based on total weight of the foam-forming composition.

Clause 12. The method of one or more of Clause 8 to Clause 11, wherein the blowing agent composition is present in an amount sufficient to produce foam having a density of 1.28 to 1.80 lb/ft$^3$ (20.5 to 28.8 kg/m$^3$).

Clause 13. The method of one or more of Clause 8 to Clause 12, wherein the non-reactive silicone surface-active agent comprises a silicone polyether.

Clause 14. The method of one or more of Clause 8 to Clause 13, wherein the foam has an R-value measured at a temperature of 25° F. (−3.9° C.) that is at least as high as the R-value of the same foam laminate measured at 75° F. (23.9° C.), each when measured according to ASTM C518-17.

Clause 15. A faced rigid foam laminate having a foam density of less than 1.85 lb/ft$^3$ and an R-value measured at a temperature of 35° F. (1.7° C.) that is at least as high as the R-value of the same foam laminate measured at 75° F. (23.9° C.), each when measured according to ASTM C518-17, comprising the reaction product of an organic polyisocyanate and a polyester polyol with a nominal hydroxyl functionality of at least 2.0 in the presence of foam-forming composition components comprising: (i) a blowing agent composition present in an amount sufficient to produce foam having a density of less than 1.85 lb/ft$^3$ and comprising: (1) n-pentane, isopentane, cyclopentane, or a mixture of any two or more thereof, and (2) water, (ii) a trimerization catalyst, (iii) a flame retardant, and (iv) a non-reactive silicone surface-active agent that has a Relative Hydrocarbon Solubility of at least 1.20, a Surfactant Water Solubility of 1.0% to 2.0%, and a Surfactant Turbidity of at least 150.

Clause 16. The faced rigid foam laminate of Clause 15, wherein the reactive silicone surface-active agent has a Relative Hydrocarbon Solubility of at least 1.25, a Surfactant Water Solubility of 1.0% to 1.5%, and a Surfactant Turbidity of 150 to 400.

Clause 17. The faced rigid foam laminate of Clause 15 or Clause 16, wherein the n-pentane, isopentane, cyclopentane, or mixture of any two or more thereof is present in the foam-forming composition in an amount of 3% to 10% by weight, based on total weight of the foam-forming composition.

Clause 18. The faced rigid foam laminate of one or more of Clause 15 to Clause 17, wherein water is included in the foam-forming composition in an amount of 0.5% to 1.0% by weight, based on total weight of the foam-forming composition.

Clause 19. The faced rigid foam laminate of one or more of Clause 15 to Clause 18, wherein the blowing agent composition is present in an amount sufficient to produce foam having a density of 1.28 to 1.80 lb/ft$^3$ (20.5 to 28.8 kg/m$^3$).

Clause 20. The faced rigid foam laminate of one or more of Clause 15 to Clause 19, wherein the non-reactive silicone surface-active agent comprises a silicone polyether.

Clause 21. The faced rigid foam laminate of one or more of Clause 15 to Clause 20, wherein the foam has an R-value measured at a temperature of 25° F. (−3.9° C.) that is at least as high as the R-value of the same foam laminate measured at 75° F. (23.9° C.), each when measured according to ASTM C518-17.

The non-limiting and non-exhaustive examples that follow are intended to further describe various non-limiting and non-exhaustive embodiments without restricting the scope of the embodiments described in this specification.

EXAMPLES

Example 1: Characterization of Surfactant Polarity and Blowing Agent Solubilization Surfactant mixtures were prepared and analyzed in the manner described below. Results are shown in Table 2.

Determination of Surfactant Water Solubility and Turbidity

Surfactant Water Solubility was determined by adding surfactant drop-wise to a 40 mL clear glass vial that contained 15 grams of deionized water. The vial was weighed on an analytical balance, capped, and shaken vigorously between each drop to ensure that the mixture remained clear and the amount of surfactant added was recorded. This process was continued until persistent cloudiness was observed indicating the onset of visual turbidity or the amount of surfactant in the mixture equaled or exceeded 5%. The sample was then subjected to a turbidity analysis using a HACH 2100P Turbidimeter, in which a beam of light is directed through the sample and light scattered by suspended particles in the sample is detected. The intensity of the scattered light is compared to a standard suspension and the result is expressed in Nephelometric Turbidity Units (NTU).

Determination of Relative Hydrocarbon Solubility in Polyol

A control sample was prepared by blending a selected amount of hydrocarbon blowing agent(s) to be used in a proposed polyisocyanurate foam-forming composition with the polyol(s) to be used in the foam-forming composition using a high speed air-driven mixer. For these examples, 266.31 grams of Stepanpol® PS-2352 aromatic polyester polyol, commercially available from Stepan Co., was combined with 58.69 grams of n-pentane to make a control blend. Some of this mixture was immediately transferred to fill a 40 mL clear glass vial, sealed, and the remainder was added to a small-mouth ½ pint jar and capped. This process was repeated except that 3.95 grams of each surfactant was blended separately with 263.07 grams of the polyol prior to adding 57.98 grams of n-pentane. The vials were set aside to allow complete separation of any pentanes that were not dissolved or dispersed in the polyol without the presence of a cloudy interfacial layer. N-pentane blends developed a colorless top layer of the blowing agent within about two weeks, but the cyclopentane control and some of the cyclopentane surfactant blends started out as a cloudy single phase that developed a clear bottom layer that was determined to be comprised primarily of lower molecular weight oligomers of polyester polyol with cyclopentane dissolved in the remainder of the clear polyester polyol upper layer. Some surfactant blends formed clear single phase solutions. The formation of two clear layers from the cloudy blends took three to ten weeks depending upon lot/batch of polyol used, but no instances of separation of a pure cyclopentane top layer was ever observed with this polyol.

A pipet was used to carefully remove the top liquid layer of aliphatic pentane blowing agent. The test sample was acquired by inserting a pipet halfway down the bottom layer and then evacuating the trapped air inside the pipet tip. Once the pipet was full, it was removed from the sample and the outside was wiped clean before dispensing 1 gram of the polyol into an empty glass vial to record sample weight. Monochlorobenzene (MCB) was added to the sample to obtain a concentration of 1.0 gram in 10 mL. The amount of n-pentane in the polyol sample was determined by direct insertion GC analysis of the MCB solution and applying a multipoint calibration curve to the data. The pentane concentrations are recorded in Table 3. A relative pentane solubility factor was calculated by dividing the pentane concentration normalized to the polyol in the polyol surfactant blend by the pentane concentration in the control polyol prepared on the same date. This value is also shown in the table and illustrates the surfactant's ability to dissolve or disperse pentane in the polyol used in the foam formulations.

TABLE 2

| Surfactant Name | Surfactant Water Solubility Amount | Surfactant Water Solubility Turbidity | Pentane Solubility g/g Polyol | Relative Pentane Solubility |
|---|---|---|---|---|
| Tegostab B8871 | 1.31% | 339 | 0.139 | 1.26 |
| Tegostab ® B84506 | 1.20% | 223 | 0.149 | 1.36 |
| Tegostab ® B8513 | 0.34% | 194 | 0.151 | 1.37 |
| Dabco ® SI3201 | 1.04% | 186 | 0.121 | 1.10 |
| Tegostab ® B84504 | 5.30% | 42 | 0.133 | 1.21 |
| Dabco ® SI3203 | 2.10% | 384 | 0.125 | 1.14 |
| Dabco ® SI3504 | 6.84% | 156 | 0.124 | 1.12 |
| Tegostab ® B8465# | 0.72% | 79 | 0.148 | 1.11 |
| Dabco ® DC193 | 5.06% | 8 | 0.107 | 0.98 |
| Tegostab ® B8536* | 5.00% | 92 | 0.112 | 1.03 |
| Dabco ® DC5598 | 5.03% | 42 | 0.112 | 1.02 |
| Control 1* | | | 0.109 | 1.00 |
| Control 2# | | | 0.134 | 1.00 |
| Control 3 | | | 0.110 | 1.00 |

*Control 1 was the control for all surfactant entries with this symbol.
Control 2 was the control for all surfactant entries with this symbol.
Control 3 was control for all other surfactant tests.

Examples 1-10: Preparation of Polyisocyanurate Foam-Forming Compositions According to the Invention Various polyisocyanurate foam-forming compositions were prepared using the components and amounts (in parts by weight) listed in Table 3. In each case, the NCO and POLYOL were used in relative amount to provide an isocyanate index (ratio of the equivalent amount of isocyanate used relative to the theoretical equivalent of one equivalent isocyanate per one equivalent of hydroxyl) of 2.41 to 2.50.

TABLE 3

| Component | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| POLYOL[1] | 26.00 | 25.99 | 25.99 | 26.03 | 26.01 | 27.13 | 27.13 | 27.16 | 26.59 | 26.59 |
| Fyrol ® PCF[2] | 2.86 | 2.86 | 2.86 | 2.86 | 2.86 | 3.39 | 3.39 | 3.40 | 3.32 | 3.32 |
| TEGOSTAB ® B 8871[3] | 0.65 | — | — | — | — | 0.68 | — | — | — | — |
| TEGOSTAB ® B 84506[3] | — | 0.65 | — | — | — | — | 0.68 | — | — | — |
| TEGOSTAB ® B 8513[3] | — | — | 0.65 | — | — | — | — | 0.68 | — | — |
| DABCO ® SI 3201[3] | — | — | — | 0.65 | — | — | — | — | — | — |
| TEGOSTAB ® B 84504 | — | — | — | — | 0.65 | — | — | — | 0.66 | 0.66 |
| Dabco ® K-15[4] | 1.87 | 1.87 | 1.87 | 1.87 | 1.87 | 1.46 | 1.46 | 1.46 | 1.60 | 1.60 |
| Polycat ® 46[5] | 0.31 | 0.31 | 0.31 | 0.31 | 0.31 | 0.15 | 0.15 | 0.15 | 0.31 | 0.31 |
| PMDETA[6] | 0.16 | 0.16 | 0.16 | 0.16 | 0.16 | 0.15 | 0.15 | 0.15 | 0.15 | 0.15 |
| Water | 0.50 | 0.50 | 0.50 | 0.50 | 0.50 | 0.41 | 0.41 | 0.41 | 0.40 | 0.40 |
| n-Pentane | 6.21 | 6.21 | 6.21 | 6.22 | 6.22 | — | — | — | — | — |
| Cyclopentane | — | — | — | — | — | 4.51 | 4.51 | 4.52 | 4.25 | 3.72 |
| Isopentane | — | — | — | — | — | 1.13 | 1.13 | 1.13 | 1.06 | 1.60 |
| NCO[7] | 61.44 | 61.45 | 61.46 | 61.40 | 61.43 | 61.00 | 61.00 | 60.95 | 61.64 | 61.64 |
| Index | 2.41 | 2.41 | 2.41 | 2.41 | 2.41 | 2.50 | 2.50 | 2.50 | 2.50 | 2.50 |

[1]Stepanpol ® PS-2352 polyester polyol having a functionality of 2 and an OH Value of 235 which is commercially available from the Stepan Company.
[2]an alkyl phosphate flame retardant based on Tris(2-chloroisopropyl) phosphate commercially available from ICL-Supresta
[3]Surfactant which is commercially available from Evonik Industries.
[4]Potassium octoate commercially available from Evonik Industries.
[5]Potassium acetate commercially available from Evonik Industries.
[6]Pentamethyldiethylenetriamine catalyst commercially available from Evonik Industries.
[7]Polymeric MDI which is commercially available under the name Mondur ® 489 from Covestro LLC.

Preparation of Polyisocyanurate Faced Foam Laminates

Polyisocyanurate laminated boardstock foam samples were prepared on a pilot-scale Hennecke unit at the Covestro LLC, Pittsburgh, Pa. facility in which the laminator is approximately 26 feet (7.92 meters) long and equipped with a single mix-head which makes boards that are 30 inches (0.76 meters) wide. The mix-head is outfitted with a two-stream "T" made with chlorinated polyvinyl chloride piping. The B side resin blend (i.e., isocyanate-reactive component) is premixed with the third-streamed blowing agent inline at 1800 psi (12.41 MPa) to 2500 psi (17.24 MPa) via a special Triple Action Dispersion Device (TADD) from Komax, Inc. prior to entering the static mixer and exiting the mix-head after being subjected to impingement mixing at 1800 psi (12.41 MPa) to 2500 psi (17.24 MPa). The conditions used for foams made in this study were as follows: Total Feed Rate—25 to 35 lbs/min (11.3 to 15.9 kg/min); Resin Temperature—82° F. (27.8° C.); Isocyanate Temperature—82° F. (27.8° C.); Platen Temperature—145° F. (62.8° C.); and Line Speed—25 to 38 ft/min (7.62 to 11.58 m/min).

The nominal board thicknesses for tested foam-forming composition of Table 3 was set at 2 inches (51 mm) and the foam was laminated with fiberglass reinforced cellulosic facer. The board was perforated on the top surface using a weighted spiked roller and on the bottom surface using a fixed spike roller as it exited the unit. The finished faced foam laminate was cut into 8' (2.44 m) long boards as it exited the laminator and the boards were stacked in bundles to cure as the chemical reaction went to completion.

The foams met standard foam physical properties requirements for Type II products in accordance with ASTM C 1289, Standard Specification for Faced Rigid Cellular Polyisocyanurate Thermal Insulation Board. Selected physical properties are listed in Table 4.

TABLE 4

| Property | Result |
| --- | --- |
| Core Density | 1.28 to 1.32 lb/ft³ (20.50 to 21.14 kg/m³) |
| Thickness | 2.14 to 2.19 inches (54.38 to 55.68 millimeters) |
| Dimensional Stability Thickness @ −40 F. | −0.40% to 0% |

Measurement of Temperature Dependent Thermal Resistance and Determination of Relative R-Value Index (RRI)

One of the faced foam laminate boards prepared from each of the ten foam formulations was taken from the center of the foam bundle within 24 hours of production after cooling and one 12"×12" (0.305 m×0.305 m) sample was cut from the center of the board, k-factor was measured at a mean temperature of 75° F. (23.9° C.), and the sample was then stored in a constant temperature/humidity environment. After approximately 20 to 30 days, the sample was subjected to a series of 8 to 12 programmed k-factor measurements at mean temperatures ranging from 104° F.). (40 C.° to 20° F. (−6.7° C.) in a single test sequence. The R-values were recorded and the RRI values at each temperature were calculated by taking the R-value of the faced rigid foam laminate at that temperature minus its R-value at 75° F. (23.9° C.) divided by its R-value at 75° F. (23.9° C.) expressed in percent. This information was used to determine the crossover temperature for the foam formulation where the term refers to the temperature where the R-value of a faced rigid foam laminate is equal to its R-value at 75° F. (23.9° C.). Alternatively stated, the crossover temperature is the temperature where the RRI is equal to zero. R-values and RRI values for the faced foam laminates of the invention are shown respectively in Tables 5 and 6.

TABLE 5

| Mean Temperature | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- |
| 105° F. (40.6° C.) | 5.03 | 5.05 | 5.03 | 5.03 | 5.09 | | | | | |
| 95° F. (35.0° C.) | 5.38 | 5.38 | 5.35 | 5.38 | 5.39 | | | | | |
| 85° F. (29.4° C.) | 5.68 | 5.68 | 5.65 | 5.65 | 5.66 | | | | | |
| 75° F. (23.9° C.) | 5.88 | 5.88 | 5.85 | 5.88 | 5.85 | 6.25 | 6.25 | 6.29 | 6.33 | 6.33 |
| 70° F. (21.1° C.) | | | | | | 6.37 | 6.41 | 6.45 | 6.45 | 6.45 |
| 65° F. (18.3° C.) | 6.13 | 6.10 | 6.10 | 6.10 | 6.05 | 6.49 | 6.54 | 6.54 | 6.58 | 6.58 |
| 60° F. (15.6° C.) | 6.29 | 6.29 | 6.21 | 6.21 | 6.21 | 6.58 | 6.62 | 6.62 | 6.62 | 6.71 |
| 55° F. (12.8° C.) | | | | | | 6.67 | 6.67 | 6.67 | 6.67 | 6.76 |
| 50° F. (10.0° C.) | 6.37 | 6.33 | 6.29 | 6.21 | 6.19 | 6.71 | 6.71 | 6.67 | 6.67 | 6.80 |
| 40° F. (4.4° C.) | 6.21 | 6.21 | 6.06 | 5.99 | 6.15 | 6.76 | 6.71 | 6.62 | 6.54 | 6.76 |
| 35° F. (1.7° C.) | 6.06 | 6.02 | 5.95 | 5.92 | 5.85 | | | | 6.45 | 6.67 |
| 30° F. (−1.1° C.) | 6.13 | 6.1 | 5.81 | 5.71 | 5.70 | | | | | |
| 25° F. (−3.9° C.) | 5.99 | 5.92 | 5.62 | 5.56 | 5.52 | 6.76 | 6.71 | 6.58 | 6.29 | 6.45 |
| 20° F. (−6.7° C.) | 5.81 | 5.71 | 5.43 | 5.41 | 5.36 | | | | | |

TABLE 6

| Mean Temperature | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- |
| 105° F. (40.6° C.) | −14.5% | −14.1% | −14.0% | −14.6% | −13.0% | — | — | — | — | — |
| 95° F. (35.0° C.) | −8.5% | −8.5% | −8.5% | −8.6% | −7.9% | — | — | — | — | — |
| 85° F. (29.4° C.) | −3.4% | −3.4% | −3.4% | −4.0% | −3.3% | — | — | — | — | — |
| 75° F. (23.9° C.) | 0.0% | 0.0% | 0.0% | 0.0% | 0.0% | 0.0% | 0.0% | 0.0% | 0.0% | 0.0% |
| 70° F. (21.1° C.) | — | — | — | — | — | 1.9% | 2.6% | 2.5% | 1.9% | 1.9% |
| 65° F. (18.3° C.) | 4.3% | 3.7% | 4.3% | 3.7% | 3.4% | 3.8% | 4.6% | 4.0% | 3.9% | 3.9% |
| 60° F. (15.6° C.) | 7.0% | 7.0% | 6.2% | 5.6% | 6.2% | 5.3% | 5.9% | 5.3% | 4.6% | 6.0% |
| 55° F. (12.8° C.) | — | — | — | — | — | 6.7% | 6.7% | 6.0% | 5.3% | 6.7% |
| 50° F. (10.0° C.) | 8.3% | 7.7% | 7.5% | 5.6% | 5.8% | 7.4% | 7.4% | 6.0% | 5.3% | 7.5% |
| 40° F. (4.4° C.) | 5.6% | 5.6% | 3.6% | 1.8% | 5.1% | 8.2% | 7.4% | 5.3% | 3.3% | 6.7% |
| 35° F. (1.7° C.) | 3.1% | 2.4% | 1.7% | 0.6% | 0.1% | — | — | — | 1.9% | 5.3% |
| 30° F. (−1.1° C.) | 4.3% | 3.7% | −0.7% | −2.9% | −2.5% | — | — | — | — | — |
| 25° F. (−3.9° C.) | 1.9% | 0.7% | −3.9% | −5.6% | −5.6% | 8.2% | 7.4% | 4.6% | −0.6% | 1.9% |
| 20° F. (−6.7° C.) | −1.2% | −2.9% | −7.2% | −8.1% | −8.4% | — | — | — | — | — |

Examples 11-19: Preparation of Comparative Polyisocyanurate Foam-Forming Compositions Various polyisocyanurate foam-forming compositions were prepared using the components and amounts (in parts by weight) listed in Table 7. In each case, the NCO and POLYOL were used in relative amount to provide an isocyanate index (ratio of the equivalent amount of isocyanate used relative to the theoretical equivalent of one equivalent isocyanate per one equivalent of hydroxyl) of 2.41 to 2.50.

TABLE 7

| Component | Ex. 11 | Ex. 12 | Ex. 13 | Ex. 14 | Ex. 15 | Ex. 16 | Ex. 17 | Ex. 18 | Ex. 19 |
| --- | --- | --- | --- | --- | --- | --- | --- | --- | --- |
| POLYOL[1] | 26.00 | 26.10 | 25.99 | 26.03 | 25.99 | 26.05 | 26.61 | 26.64 | 26.58 |
| Fyrol ® PCF[2] | 2.86 | 2.87 | 2.86 | 2.86 | 2.86 | 2.87 | 3.33 | 3.33 | 3.32 |
| DABCO ® SI 3203[3] | 0.65 | — | — | — | — | — | — | — | — |
| DABCO ® SI 3504[3] | — | 0.65 | — | — | — | — | — | — | — |
| TEGOSTAB ® B 8465[3] | — | — | 0.65 | — | — | — | — | 0.67 | — |
| DABCO ® DC 193[3] | — | — | — | 0.65 | — | — | 0.66 | — | — |
| TEGOSTAB ® B 8536[3] | — | — | — | — | 0.65 | — | — | — | 0.66 |
| DABCO ® DC 5598[3] | — | — | — | — | — | 0.65 | — | — | — |
| Dabco ® K-15[4] | 1.87 | 1.88 | 1.87 | 1.87 | 1.87 | 1.87 | 1.60 | 1.60 | 1.59 |
| Polycat ® 46[5] | 0.31 | 0.31 | 0.31 | 0.31 | 0.31 | 0.31 | 0.31 | 0.31 | 0.31 |
| PMDETA[6] | 0.16 | 0.16 | 0.16 | 0.16 | 0.16 | 0.16 | 0.15 | 0.15 | 0.15 |
| Water | 0.50 | 0.50 | 0.50 | 0.50 | 0.50 | 0.50 | 0.40 | 0.40 | 0.40 |
| n-Pentane | 6.21 | 6.24 | 6.21 | 6.22 | 6.21 | 6.23 | — | — | — |
| Cyclopentane | — | — | — | — | — | — | 3.73 | 3.73 | 3.72 |
| Isopentane | — | — | — | — | — | — | 1.60 | 1.60 | 1.59 |
| NCO[7] | 61.44 | 61.30 | 61.46 | 61.40 | 61.46 | 61.37 | 61.64 | 61.84 | 61.66 |
| Index | 2.41 | 2.41 | 2.41 | 2.41 | 2.41 | 2.41 | 2.50 | 2.50 | 2.50 |

[1]Stepanpol ® PS-2352 polyester polyol having a functionality of 2 and an OH Value of 235 which is commercially available from the Stepan Company.
[2]an alkyl phosphate flame retardant based on Tris(2-chloroisopropyl) phosphate commercially available from ICL-Supresta
[3]Surfactant commercially available from Evonik Industries.
[4]Potassium octoate commercially available from Evonik Industries.
[5]Potassium acetate commercially available from Evonik Industries.
[6]Pentamethyldiethylenetriamine catalyst commercially available from Evonik Industries.
[7]Polymeric MDI which is commercially available under the name Mondur ® 489 from Covestro LLC.

Preparation of Comparative Polyisocyanurate Faced Foam Laminates

Polyisocyanurate laminated boardstock foam samples were prepared on a pilot-scale Hennecke unit at Covestro LLC (Pittsburgh, Pa.) in which the laminator is approximately 26 feet (7.92 meters) long and equipped with a single mix-head which makes boards that are 30 inches (0.76 meters) wide. The mix-head is outfitted with a two-stream "T" made with chlorinated polyvinyl chloride piping. The B side resin blend (i.e., isocyanate-reactive component) is premixed with the third-streamed blowing agent inline at 1800 psi (12.41 MPa) to 2500 psi (17.24 MPa) via a special Triple Action Dispersion Device (TADD) from Komax, Inc. prior to entering the static mixer and exiting the mix-head after being subjected to impingement mixing at 1800 psi (12.41 MPa) to 2500 psi (17.24 MPa). The conditions used for foams made in this study were as follows: Total Feed Rate—25 to 35 lbs/min (11.3 to 15.9 kg/min); Resin Temperature—82° F. (27.8° C.); Isocyanate Temperature—82° F. (27.8° C.); Platen Temperature—145° F. (62.8° C.); and Line Speed—25 to 38 ft/min (7.62 to 11.58 m/min).

The nominal board thicknesses for tested foam-forming composition of Table 7 was set at 2 inches (51 mm) and the foam was laminated with fiberglass reinforced cellulosic facer. The board was perforated on the top surface using a weighted spiked roller and on the bottom surface using a fixed spike roller as it exited the unit. The finished faced foam laminate was cut into 8' (2.44 m) long boards as it exited the laminator and the boards were stacked in bundles to cure as the chemical reaction went to completion.

The foams met standard foam physical properties requirements for Type II products in accordance with ASTM C 1289, Standard Specification for Faced Rigid Cellular Polyisocyanurate Thermal Insulation Board. Selected physical properties are listed in Table 8.

TABLE 8

| Property | Result |
| --- | --- |
| Core Density | 1.29 to 1.49 lb/ft$^3$ (20.66 to 23.87 kg/m$^3$) |
| Thickness | 2.07 to 2.19 inches (52.58 to 55.63 millimeters) |
| Dimensional Stability Thickness @ −40 F. | −11.1% to 0.1% |

Measurement of Temperature Dependent Thermal Resistance and Determination of Relative R-Value Index (RRI)

One of the faced foam laminate boards prepared from each of the nine comparative foam formulations was taken from the center of the foam bundle within 24 hours of production after cooling and one 12"×12" (0.305 m×0.305 m) sample was cut from the center of the board, k-factor was measured at a mean temperature of 75° F. (23.9° C.), and the sample was then stored in a constant temperature/humidity environment. After approximately 20 to 30 days, the sample is subjected to a series of 8 to 12 programmed k-factor measurements at mean temperatures ranging from 104° F.). (40 C.° to 20° F. (−6.7° C.) in a single test sequence. The R-values are recorded and the RRI values at each temperature are calculated by taking the R-value of the faced rigid foam laminate at that temperature minus its R-value at 75° F. (23.9° C.) divided by its R-value at 75° F. (23.9° C.) expressed in percent. This information was used to determine the crossover temperature for the foam formulation, i.e., the temperature where the R-value of a faced rigid foam laminate is equal to its R-value at 75° F. (23.9° C.). Alternatively stated, the crossover temperature is the temperature where the RRI is equal to zero. R-values and RRI values for the faced foam laminates of the invention are shown respectively in Tables 9 and 10.

TABLE 9

| Mean Temperature | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| 105° F. (40.6° C.) | 4.98 | 5.03 | 5.26 | 4.81 | 5.29 | 5.08 | | | |
| 95° F. (35.0) | 5.32 | 5.38 | 5.56 | 5.13 | 5.56 | 5.41 | | | |
| 85° F. (29.4) | 5.62 | 5.71 | 5.81 | 5.43 | 5.85 | 5.75 | | | |
| 75° F. (23.9) | 5.85 | 5.95 | 6.02 | 5.59 | 6.02 | 5.95 | 5.92 | 6.17 | 6.25 |
| 70° F. (21.1) | | | | | | | 6.06 | 6.33 | 6.37 |
| 65° F. (18.3) | 6.10 | 6.17 | 6.21 | 5.81 | 6.21 | 6.17 | 6.17 | 6.45 | 6.49 |
| 60° F. (15.6) | 6.21 | 6.37 | 6.37 | 5.99 | 6.37 | 6.37 | 6.29 | 6.54 | 6.58 |
| 55° F. (12.8) | | | | | | | 6.33 | 6.62 | 6.62 |
| 50° F. (10.0) | 6.17 | 6.37 | 6.29 | 5.81 | 6.37 | 6.33 | 6.37 | 6.62 | 6.62 |
| 40° F. (4.4) | 5.88 | 5.95 | 6.02 | 5.52 | 6.06 | 5.99 | 6.25 | 6.41 | 6.41 |
| 35° F. (1.7) | 5.78 | 5.71 | 5.92 | 5.46 | 5.88 | 5.75 | 6.13 | 6.29 | 6.25 |
| 30° F. (−1.1) | 5.52 | 5.65 | 5.65 | 5.13 | 5.68 | 5.56 | | | |
| 25° F. (−3.9) | 5.32 | 5.41 | 5.43 | 4.98 | 5.43 | 5.32 | 5.92 | 5.99 | 5.92 |
| 20° F. (−6.7) | 5.15 | 5.18 | 5.24 | 4.83 | 5.18 | 5.08 | | | |

TABLE 10

| Mean Temperature | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| 105° F. (40.6° C.) | −14.9% | −15.6% | −12.6% | −13.9% | −12.2% | | | | |
| 95° F. (35.0) | −9.0% | −9.7% | −7.8% | −8.2% | −7.8% | | | | |
| 85° F. (29.4) | −3.9% | −4.0% | −3.5% | −2.7% | −2.9% | | | | |
| 75° F. (23.9) | 0.0% | 0.0% | 0.0% | 0.0% | 0.0% | 0.0% | 0.0% | 0.0% | 0.0% |
| 70° F. (21.1) | | | | | | | 2.4% | 2.5% | 1.9% |
| 65° F. (18.3) | 4.3% | 3.7% | 3.1% | 4.1% | 3.1% | 3.7% | 4.3% | 4.5% | 3.9% |
| 60° F. (15.6) | 6.2% | 7.0% | 5.7% | 7.2% | 5.7% | 7.0% | 6.3% | 5.9% | 5.3% |
| 55° F. (12.8) | | | | | | | 7.0% | 7.3% | 6.0% |
| 50° F. (10.0) | 5.6% | 7.0% | 4.4% | 4.1% | 5.7% | 6.3% | 7.6% | 7.3% | 6.0% |
| 40° F. (4.4) | 0.6% | 0.0% | 0.0% | −1.1% | 0.6% | 0.6% | 5.6% | 3.9% | 2.6% |
| 35° F. (1.7) | −1.2% | −4.0% | −1.8% | −2.2% | −2.4% | −3.5% | 3.7% | 1.9% | 0.0% |
| 30° F. (−1.1) | −5.5% | −5.1% | −6.2% | −8.2% | −5.7% | −6.7% | | | |
| 25° F. (−3.9) | −9.0% | −9.2% | −9.8% | −11.0% | −9.8% | −10.6% | 0.0% | −3.0% | −5.3% |
| 20° F. (−6.7) | −11.9% | −13.0% | −13.1% | −13.5% | −14.0% | −14.7% | | | |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A method for formulating a polyisocyanurate foam-forming composition, comprising:
    a) an organic polyisocyanate,
    b) a polyol composition comprising at least one polyester polyol with a nominal hydroxyl functionality of at least 2.0,
    c) a blowing agent composition present in an amount sufficient to produce foam having a density of less than 1.85 lb/ft$^3$ and comprising:
        (1) a hydrocarbon having an atmospheric pressure boiling point of at least 68° F. (20° C.), and
        (2) water,
    d) a trimerization catalyst,
    e) a flame retardant, and
    f) a non-reactive silicone surface-active agent,
    the method comprising:
    (A) evaluating a measured Relative Hydrocarbon Solubility and, optionally, evaluating a measured a Surfactant Water Solubility, a Surfactant Turbidity, or evaluating both the Surfactant Water Solubility and the Surfactant Turbidity; and
    (B) formulating the polyisocyanurate foam-forming composition with a non-reactive silicone surface-active agent that either:
        (i) has a Relative Hydrocarbon Solubility of at least 1.20; or
        (ii) has a Surfactant Water Solubility of less than 2%, a Surfactant Turbidity greater than 100, and a Relative Hydrocarbon Solubility of at least 1.05 and less than 1.20.

2. The method of claim 1, wherein the hydrocarbon having an atmospheric pressure boiling point of at least 20° C. (68° F.) comprises n-pentane, isopentane, cyclopentane, or a mixture of any two or more thereof.

3. The method of claim 2, wherein the hydrocarbon having an atmospheric pressure boiling point of at least 20° C. (68° F.) is present in the foam-forming composition in an amount of 3% to 10% by weight, based on total weight of the foam-forming composition.

4. The method of claim 3, wherein water is included in the foam-forming composition in an amount of 0.05% to 1.0% by weight, based on total weight of the foam-forming composition.

5. The method of claim 4, wherein the blowing agent composition is present in an amount sufficient to produce foam having a density of 1.28 to 1.80 lb/ft$^3$ (20.5 to 28.8 kg/m3).

6. The method of claim 5, wherein the non-reactive silicone surface-active agent comprises a silicone polyether.

7. The method of claim 1, wherein the non-reactive silicone surface-active agent exhibits (i) a Relative Hydrocarbon Solubility of at least 1.20, (ii) a Surfactant Water Solubility of 1.0% to 2.0%, and (iii) a Surfactant Turbidity of at least 150.

8. A method for producing a faced rigid foam laminate having a foam density of less than 1.85 lb/ft$^3$ and an R-value measured at a temperature of 35° F. (1.7° C.) that is at least as high as the R-value of the same foam laminate measured at 75° F. (23.9° C.), each when measured according to ASTM C518-17, the method comprising:
  reacting an organic polyisocyanate and a polyester polyol with a nominal hydroxyl functionality of at least 2.0 in the presence of foam-forming composition components comprising:
  (i) a blowing agent composition present in an amount sufficient to produce foam having a density of less than 1.85 lb/ft$^3$ and comprising:
    (1) n-pentane, isopentane, cyclopentane, or a mixture of any two or more thereof, and
    (2) water,
  (ii) a trimerization catalyst,
  (iii) a flame retardant, and
  (iv) 0.1 to 1% by weight, based on the total weight of the foam-forming composition, of a non-reactive silicone surface-active agent that has a Relative Hydrocarbon Solubility of at least 1.20, a Surfactant Water Solubility of 1.0% to 2.0%, and a Surfactant Turbidity of at least 150.

9. The method of claim 8, wherein the reactive silicone surface-active agent has a Relative Hydrocarbon Solubility of at least 1.25, a Surfactant Water Solubility of 1.0% to 1.5%, and a Surfactant Turbidity of 150 to 400.

10. The method of claim 8, wherein the n-pentane, isopentane, cyclopentane, or mixture of any two or more thereof is present in the foam-forming composition in an amount of 3% to 10% by weight, based on total weight of the foam-forming composition.

11. The method of claim 10, wherein water is included in the foam-forming composition in an amount of 0.05% to 1.0% by weight, based on total weight of the foam-forming composition.

12. The method of claim 8, wherein the blowing agent composition is present in an amount sufficient to produce foam having a density of 1.28 to 1.80 lb/ft$^3$ (20.5 to 28.8 kg/m3).

13. The method of claim 8, wherein the non-reactive silicone surface-active agent comprises a silicone polyether.

14. The method of claim 8, wherein the foam has an R-value measured at a temperature of 25° F. (−3.9° C.) that is at least as high as the R-value of the same foam laminate measured at 75° F. (23.9° C.), each when measured according to ASTM C518-17.

15. The method of claim 1, wherein the polyisocyanurate foam-forming composition comprises 0.1 to 1.0% by weight, based on the total weight of the foam-forming composition, of the non-reactive silicone surface-active agent.

\* \* \* \* \*